US012417786B1

(12) United States Patent
Rajauria et al.

(10) Patent No.: US 12,417,786 B1
(45) Date of Patent: Sep. 16, 2025

(54) THERMAL FLY HEIGHT CALIBRATION FOR DATA STORAGE DEVICE

(71) Applicant: Western Digital Technologies, Inc., San Jose, CA (US)

(72) Inventors: Sukumar Rajauria, San Jose, CA (US); Tan Trinh, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/815,597

(22) Filed: Aug. 26, 2024

(51) Int. Cl.
*G11B 5/60* (2006.01)

(52) U.S. Cl.
CPC .................. *G11B 5/607* (2013.01)

(58) Field of Classification Search
None
See application file for complete search history.

(56) References Cited

U.S. PATENT DOCUMENTS

| | | | | |
|---|---|---|---|---|
| 8,634,167 B2* | 1/2014 | Hsiao | ..................... | G11B 5/607 |
| | | | | 360/125.31 |
| 8,817,425 B1* | 8/2014 | Wu | ..................... | G11B 5/3967 |
| | | | | 360/320 |
| 8,976,480 B1 | 3/2015 | Canchi et al. | | |
| 9,058,829 B1 | 6/2015 | Wolf et al. | | |
| 9,251,829 B2* | 2/2016 | Ngan | ..................... | G11B 27/36 |
| 9,472,225 B2 | 10/2016 | Lou et al. | | |
| 9,564,163 B2* | 2/2017 | Contreras | ............... | G11B 5/607 |
| 9,595,281 B2 | 3/2017 | Rajauria et al. | | |
| 9,842,618 B1 | 12/2017 | Hutchinson et al. | | |
| 9,928,863 B2* | 3/2018 | Sato | ..................... | G11B 5/6076 |
| 10,395,678 B1 | 8/2019 | Rajauria et al. | | |
| 10,679,653 B1* | 6/2020 | Zeng | ..................... | G11B 5/40 |
| 10,839,843 B1* | 11/2020 | Zeng | ..................... | G11B 5/6052 |
| 11,869,546 B1* | 1/2024 | Zeng | ..................... | G11B 5/607 |
| 12,176,015 B1* | 12/2024 | Knigge | ................ | G11B 5/6076 |
| 2013/0293984 A1* | 11/2013 | Poss | ..................... | G11B 5/607 |
| | | | | 360/75 |

(Continued)

OTHER PUBLICATIONS

Murthy et al.; "In-Situ Contact Potential Measurement in Hard Disk Drives Using Head Disk Interface Voltage Control"; Proceedings of the ASME 2014 Conference on Information Storage and Processing Systems; Jun. 2014; available at: https://www.researchgate.net/publication/267651434.

(Continued)

*Primary Examiner* — Fred Tzeng
(74) *Attorney, Agent, or Firm* — Barry IP Law, P.C.

(57) ABSTRACT

A Data Storage Device (DSD) includes a disk and a slider. A change in distance between the slider and the disk is determined by applying a first voltage to the slider that increases an electrostatic force between the slider and the disk. The change in distance is approximately the same across a surface of the slider facing the disk. A first power supplied to the heating element is determined that causes thermal expansion of a portion of the slider until making disk contact without applying the first voltage. A second power supplied to the heating element is determined that causes a reduced thermal expansion of the portion until making disk contact while applying the first voltage. A first power setting is calibrated based on a correlation between the determined change in distance and a difference between the first and second powers.

20 Claims, 9 Drawing Sheets

(56) References Cited

U.S. PATENT DOCUMENTS

2014/0240871 A1  8/2014  Canchi et al.
2020/0058323 A1  2/2020  Wei et al.

OTHER PUBLICATIONS

Xiong et al.; "Spacing Control in Heat Assisted Magnetic Recording"; IEEE Transactions on Magnetics, vol. 55, Issue 3; Sep. 18, 2018; available at: http://tmrc2018.ucsd.edu/Archive/B1.pdf.
Pending U.S. Appl. No. 18/749,611, titled "Interface Voltage Control for Slider in Data Storage Device", filed Jun. 21, 2024.

* cited by examiner

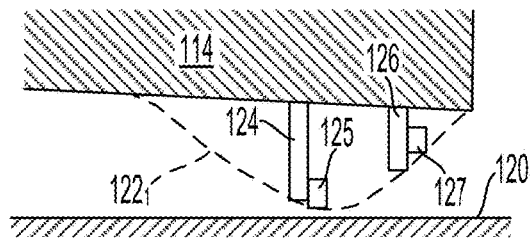
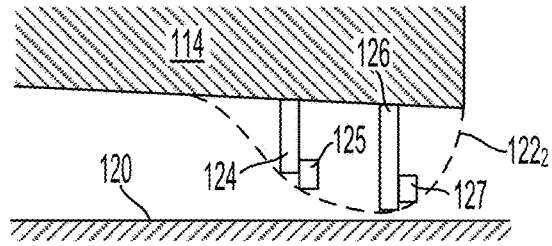
FIG. 2A    FIG. 2B
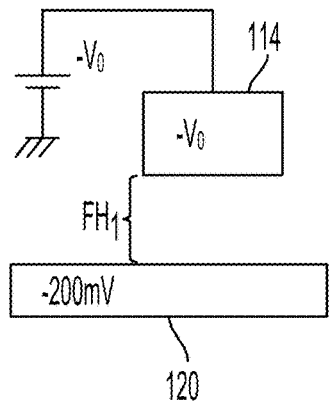
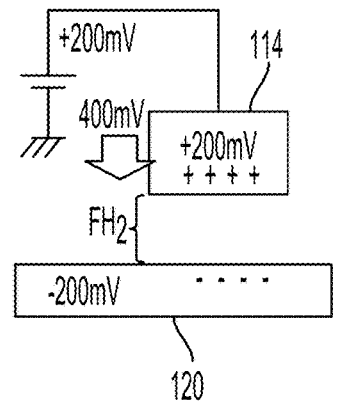
FIG. 3A    FIG. 3B

THERMAL FLY HEIGHT CALIBRATION FOR DATA STORAGE DEVICE

BACKGROUND

Data Storage Devices (DSDs) are often used to record data onto or to reproduce data from storage media. One type of storage media includes one or more rotating magnetic disks, such as in a Hard Disk Drive (HDD). In such DSDs, a slider including read and write transducers or elements is typically positioned in relation to a magnetic disk to magnetically read and write data in a recording layer of the magnetic disk. The slider is attached to an actuator arm by a suspension and positioned very close to the disk surface by the suspension (e.g., within five nanometers). There is typically a stack of disks in the DSD with a slider-suspension assembly associated with each disk surface in the stack.

The separation or spacing between the slider and the disk surface is called the fly height. The slider has a disk-facing Gas-Bearing Surface (GBS) that causes the slider to ride on a cushion or bearing of gas, typically air or helium, generated by rotation of the disk. The slider is attached to a flexure on the suspension and the suspension includes a load beam that applies a load force to the slider to counteract the gas-bearing force while permitting the slider to "pitch" and "roll." The flying dynamics of the slider, and thus the fly height, are influenced by factors such as the rotation speed of the disk, the aerodynamic shape of the slider's GBS, the load force applied to the slider by the suspension, and the pitch and roll torques applied to the slider by the suspension.

The amount of data stored in a given area on the magnetic disk, or areal density of the magnetic disk's surface, continues to increase with each generation of DSDs that use magnetic disks. One way to increase the areal density is to increase the number of magnetic bits or grains that can be written in the recording layer by placing the magnetic bits closer together. To accomplish this, the write transducer or write element of the slider is moved closer to the surface of the magnetic disk. Similarly, when reading data from the magnetic disk, the read transducer or read element can be moved closer to the surface of the disk to more accurately read the tighter configuration of magnetic bits in the recording layer.

One technique for moving the write element and/or the read element closer to the magnetic disk surface includes Thermal Fly-height Control (TFC) where one or more heating elements in the slider are powered to cause thermal expansion of the slider, or at least the portions of the slider including the write element and/or the read element, towards the magnetic disk surface when writing and/or reading data. By applying power to one or more heating elements in the slider, the surrounding slider material expands in response to heat generated by the heating element(s), which causes a bulge in the slider toward the disk, thus reducing the fly height. This reduced fly height can be controlled to achieve a greater data storage density when writing data and also to reduce variation in the fly height while writing and reading data.

To calibrate the power or current supplied to a heating element that thermally expands primarily a portion of the slider including the read element, a read signal from the read element can be used to determine or estimate the fly height changes caused by the power supplied to the heating element. To calibrate the power or current supplied to a different heating element that thermally expands primarily another portion of the slider including the write element, the thermal expansion is typically simulated or estimated based on the calibration of the read element portion of the slider.

However, as the fly height continues to get closer to the disk surface for write operations to increase areal density, tighter control of the fly height for the write element portion of the slider is needed. In this regard, there are typically manufacturing variations among sliders, such as slight differences in slider material compositions and differences in heating element performance, that become more noticeable due to the extremely small scale of the slider, its fly height, and the magnetic bits being written in the recording layer.

Oftentimes, it is difficult to properly simulate or estimate the thermal expansion of the write element portion of the slider and its associated fly height based on measurements used for the read element portion of the slider. In addition to the above-noted manufacturing variations in sliders, TFC of the write portion of the slider can be more complicated than TFC of the read portion of the slider due to localized heating caused by the high frequency write current applied to the write element's write coil during write operations. This can make it challenging to properly calibrate the power supplied to the heating element and tightly control the fly height during write operations, which can increase error rates in reading data and/or damage the slider by contacting or flying too close to the magnetic disk too often. In some cases, the fly height may need to be increased as a precaution, which can result in a lower areal density for the magnetic disk.

SUMMARY

In view of the foregoing challenges, the systems and processes of the present disclosure calibrate Thermal Fly-height Control (TFC) power settings to provide a more accurate calibration and control of the power supplied to one or more heating elements that cause thermal expansion of a slider.

In some aspects of the present disclosure, the slider includes a first heating element for controlling a first distance between a first portion of the slider and the magnetic disk, and a second heating element for controlling a second distance between a second portion of the slider and the magnetic disk. The first portion of the slider includes the read element, and the second portion of the slider includes the write element.

A first power is supplied to the second heating element that causes thermal expansion of the second portion of the slider to make contact with the magnetic disk without applying a first voltage to the slider. When applied to the slider, the first voltage causes a change in the first distance by causing an electrostatic force between the slider and the magnetic disk. Overall, the change in the first distance approximately equals a change in the second distance when the first voltage is applied to the slider.

A second power is supplied to the second heating element that causes a reduced thermal expansion of the second portion of the slider, as compared to the first power, to make contact with the magnetic disk while applying the first voltage to the slider. A first power setting is calibrated for the second heating element based on a correlation between the change in the first distance and a difference between the first power and the second power.

In other aspects of the present disclosure, the change in distance caused by applying the first voltage to the slider is determined. As noted above, the change in distance caused by applying the first voltage is approximately the same across a surface of the slider that faces the magnetic disk. A first power is supplied to a heating element of the slider that causes thermal expansion of a portion of the slider to make contact with the magnetic disk, without applying the first voltage to the slider. A second power is supplied to the heating element that causes a reduced thermal expansion of the portion of the slider, as compared to the first power, that makes contact with the magnetic disk while applying the first voltage to the slider. A first power setting is calibrated for the heating element based on a correlation between the determined change in distance and a difference between the first power and the second power.

In yet other aspects of the present disclosure, a third power is supplied to the heating element, with the third power being less than the first power and greater than the second power. The third power is also closer in magnitude to the first power than to the second power, and supplying the third power causes the portion of the slider to thermally expand closer to the magnetic disk than supplying the second power to the heating element. A second voltage applied to the slider is determined to create an electrostatic force between the slider and the magnetic disk that is strong enough to cause the portion of the slider to make contact with the magnetic disk while supplying the third power to the heating element. A second power setting is calibrated for the heating element based on a correlation between the determined second voltage and a difference between the first power and the third power. The second power setting corresponds to a thermal expansion of the portion of the slider in a low clearance region between the magnetic disk and the slider.

The various exemplary aspects described above may be implemented individually or in various combinations. The foregoing features and advantages, as well as other features and advantages, of the systems and processes of the present disclosure will become apparent to those of ordinary skill in the art after consideration of the following description, the accompanying drawings, and the appended claims.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

FIG. 2A illustrates thermal expansion of a slider due to power supplied to two heating elements in the slider with a first predetermined ratio of power between the heating elements according to one or more embodiments.

FIG. 2B illustrates thermal expansion of the slider due to power supplied to the two heating elements with a second predetermined ratio of power between the heating elements according to one or more embodiments.

FIG. 3A illustrates an initial fly height of a slider over a magnetic disk when an initial voltage is applied to the slider according to one or more embodiments.

FIG. 3B illustrates a reduced fly height of the slider over the magnetic disk when a first voltage is applied to the slider according to one or more embodiments.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

Example Data Storage Device

Figure 1:
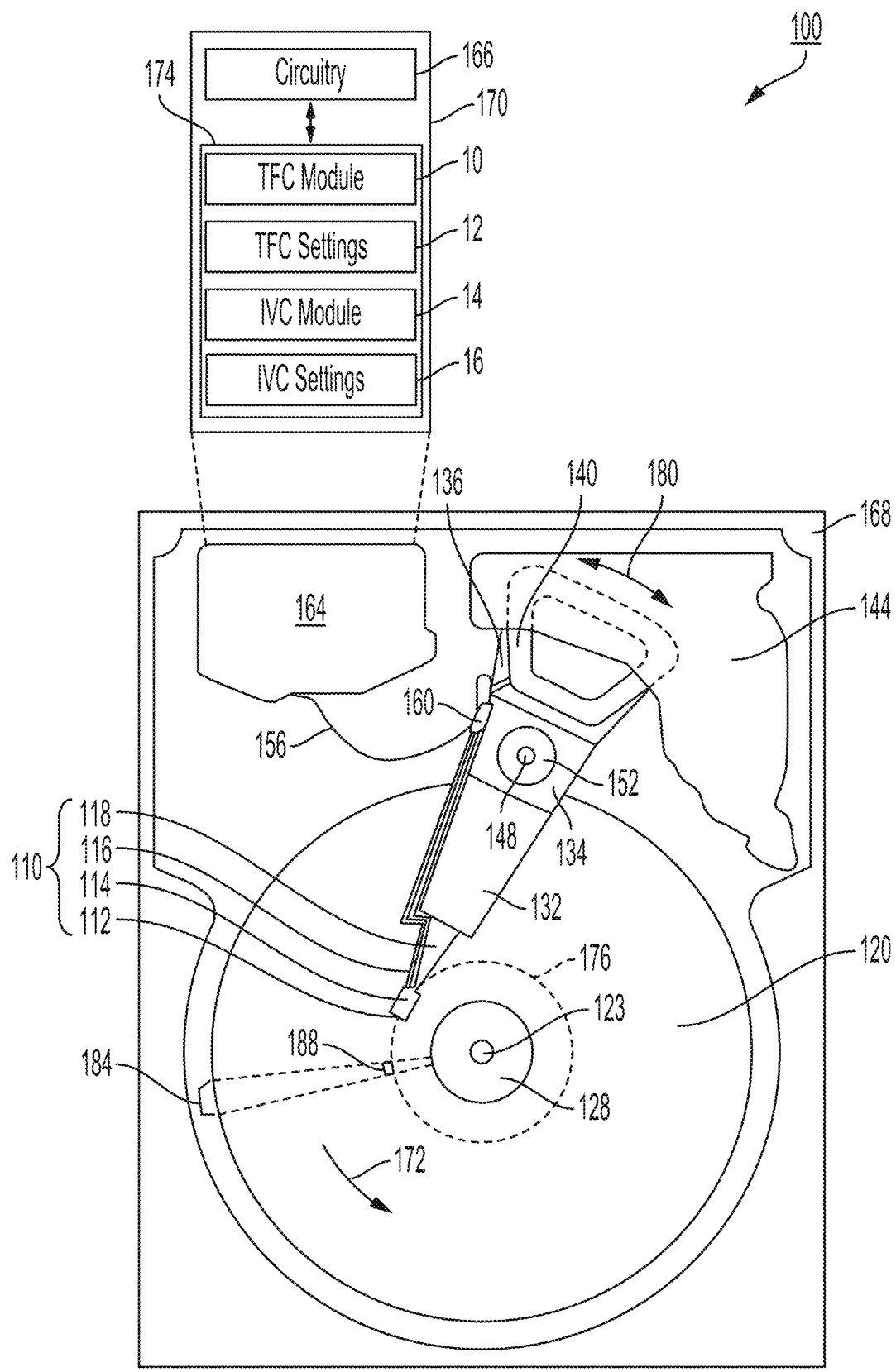
FIG. 1 is a plan view of an example Data Storage Device (DSD) according to one or more embodiments.

FIG. 1 is a plan view of example Data Storage Device (DSD) 100 according to one or more embodiments to illustrate an exemplary operating environment. In some implementations, DSD 100 can include a Hard Disk Drive (HDD) or other type of DSD including one or more magnetic disks as a data recording medium, such as a Solid-State Hybrid Drive (SSHD) that can include solid-state non-volatile memory in addition to one or more magnetic disks.

As shown in the example of FIG. 1, DSD 100 includes slider 114 that includes magnetic reading/recording head 112. Collectively, slider 114 and head 112 may be referred to as a head slider. DSD 100 further includes at least one Head Gimbal Assembly (HGA) 110 including the head slider, lead suspension 116 attached to the head slider typically via a flexure, and load beam 118 attached to lead suspension 116.

DSD 100 also includes at least one magnetic disk 120 rotatably mounted on spindle 123 and a drive motor (not visible) attached to spindle 123 for rotating magnetic disk 120. Head 110a includes a writer or write element and a reader or read element for respectively writing and reading data stored on magnetic disk 120 of DSD 100. Magnetic disk 120 or a plurality of magnetic disks stacked below magnetic disk 120 may be affixed to spindle 123 with disk clamp 128.

As shown in FIG. 1, DSD 100 further includes arm 132 attached to HGA 110, carriage 134, a Voice-Coil Motor (VCM) that includes armature 136 and voice coil 140 attached to carriage 134 and stator 144 including a voice-coil magnet (not visible). Armature 136 of the VCM is attached to carriage 134 and is configured to move arm 132 and HGA 110, to access portions of magnetic disk 120, being mounted on pivot shaft 148 with interposed pivot-bearing assembly 152. In the case of multiple disks, carriage 134 is called an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a Head Stack Assembly (HSA). An HSA may, however, include more or fewer components than those described. For example, an HSA may refer to an assembly that further includes electrical interconnection components. Generally, an HSA is the assembly configured to move the head slider to access portions of the magnetic disk 120 for read and write operations.

With further reference to FIG. 1, electrical signals (e.g., current to voice coil 140 of the VCM) comprising a write signal to and a read signal from head 110a, are provided by flexible interconnect cable 156 ("flex cable"). Arm-Electronics (AE) module 160, which may have an on-board pre-amplifier for the read signal, as well as other read-channel and write-channel electronic components, provides connection between flex cable 156 and head 110a. AE module 160 may be attached to carriage 134 as shown or may be included as part of circuitry 166 of controller 170. Flex cable 156 is coupled to electrical connector block 164, which provides electrical communication to controller 170 located beneath electrical connector block 164 through electrical feedthroughs provided by housing 168. Housing 168, also referred to as a base, in conjunction with a cover provides a sealed, protective enclosure for the data storage components of DSD 100.

Other electronic components, including a disk controller and servo electronics that can further include a Digital Signal Processor (DSP), provide electrical signals to the drive motor, voice coil 140 of the VCM and head 112 of the HGA 110. The electrical signal provided to the drive motor enables the drive motor to spin providing a torque to spindle 123, which is in turn transmitted to magnetic disk 120 that is affixed to spindle 123. As a result, magnetic disk 120 spins in a direction 172. The magnetic disk 120 creates a cushion of gas that acts as a gas-bearing on which the Gas-Bearing Surface (GBS) of slider 114 rides so that slider 114 flies above the surface of magnetic disk 120 without contacting a thin magnetic-recording layer of disk 120 in which data is recorded.

The electrical signal provided to voice coil 140 of the VCM enables head 110a of HGA 110 to access a track 176 in which data is recorded. Thus, armature 136 of the VCM swings through an arc 180, which enables head 110a of HGA 110 to access various tracks on magnetic disk 120. Data is stored on magnetic disk 120 in a plurality of radially nested tracks arranged in sectors on magnetic disk 120, such as sector 184. Correspondingly, each track is composed of a plurality of sectored track portions (or "track sectors"), for example, sectored track portion 188. Each sectored track portion may store recorded data and a header containing a servo-burst-signal pattern, for example, an ABCD-servo-burst-signal pattern, which is information that identifies track 176, and error correction code information. In accessing track 176, the read element of head 112 of HGA 110 reads the servo-burst-signal pattern, which provides a Position-Error-Signal (PES) to the servo electronics, which controls the electrical signal provided to voice coil 140 of the VCM, enabling head 112 to follow track 176. Upon finding track 176 and identifying sectored track portion 188, head 112 either reads data from track 176 or writes data to track 176 depending on instructions, such as instructions received by controller 170 from an external host, such as a processor of a computer system.

In the example of FIG. 1, controller 170 is shown with dashed lines connected to electrical connector block 164 to indicate that controller 170 is in electrical communication with electrical connector block 164. As will be appreciated by those of ordinary skill in the art, controller 170 in some implementations can include a Printed Circuit Board (PCB) coupled to the bottom side of DSD 100, such as to housing 168. As shown in the example of FIG. 1, controller 170 includes circuitry 166 and at least one Non-Volatile Memory (NVM) 174.

Circuitry 166 can comprise electronic components for performing different functions for operation of the DSD, such as an interface controller, a Read/Write Integrated Circuit (R/W IC), an AE module, a motor driver, a servo processor, and other digital processors and associated memory. In this regard, circuitry 166 can include one or more processors for executing instructions, such as a microcontroller, a DSP, an Application-Specific Integrated Circuit (ASIC), a Field Programmable Gate Array (FPGA), hard-wired logic, analog circuitry and/or a combination thereof. In some implementations, circuitry 166 can include a System on a Chip (SoC), which may also include one or more memories of NVM 174. In addition, and as those of ordinary skill in the art will appreciate, circuitry 166 and/or NVM 174, or portions thereof, such as Thermal Fly height Control (TFC) module 10 and/or Interface Voltage Control (IVC) module 14, may alternatively be located as part of AE module 160 in FIG. 1.

As shown in the example of FIG. 1, at least one NVM 174 stores TFC module 10, TFC settings 12, IVC module 14, and IVC settings 16. In some implementations, TFC module 10 and IVC module 14 can include computer-executable instructions stored in a non-transitory computer-readable medium that are performed by circuitry 166. TFC module 10 may use TFC settings 12 and IVC module 14 may use IVC settings 16, which may both be stored in data structures in some implementations.

As discussed in more detail below, circuitry 166 can execute TFC module 10 to supply power (e.g., provide an electrical current) to one or more heating elements in slider 114 (e.g., heating elements 124 and 126 in FIGS. 2A and 2B) to control the fly height of portions of the slider that thermally expand toward disk 120. TFC settings can include, for example, power settings (e.g., in terms of milliwatts (mW) or in terms of current such as milliamps (mA)) for the one or more heating elements that can be associated with a preheating stage power or current supplied to the heating element or elements before performing a read or write operation and writing or reading stage powers or currents supplied to the heating element during a write or read operation. In some cases, two heating elements may operate using different portions of a total power with different predetermined ratios for read operations and write operations to cause bulging of particular portions of slider 114 toward disk 120 so that the write element is closer to the disk surface during write operations and the read element is closer to the disk surface during read operations. In some implementations, the power or current supplied to one or more heating elements may differ during the write operation as compared to the preheating stage due to localized heating that may be caused by the write current supplied to a write coil of the write element.

As used herein, a "power setting" for a heating element can refer to a power or current supplied to the heating element. In addition, references to "supplying power to a heating element" as used herein can include supplying a current to the heating element that causes heating of the heating element.

Circuitry 166 can execute IVC module 14 to control the fly height of slider 114 and to protect components of slider 114 from deterioration. In conventional DSDs with a magnetic disk, an IVC can apply an "Optimum Interface Voltage" (OIV) to the slider so that a voltage of the slider matches the voltage of the disk to cancel out or minimize the potential difference between the slider and the disk. An OIV applied to the slider eliminates the attractive electrostatic force between the slider and the disk to provide a greatest fly height between the disk and the slider and thereby reduce the risk of the slider unintentionally contacting or crashing onto the disk surface and/or accumulating lubricant from the disk surface, which can reduce the performance and/or a usable life of the slider. The voltage applied to the slider can also increase the usable life of the slider in some implementations by passivating the slider or encapsulating at least a portion of the slider with a static electrical charge that can help preserve the life of the slider and its components by protecting the slider from mechanical wear and/or chemical oxidation.

IVC settings 16 can be used by IVC module 14, and can include, for example, voltages to be applied to slider 114 for controlling the fly height of slider 114 during different operations, including an OIV for maintaining a largest fly height under certain conditions. In addition, IVC settings can include voltages used in calibrating power settings for at least one heating element of slider 114, as discussed in more detail below.

Unlike conventional DSDs, the present disclosure uses IVC to calibrate one or more power settings for at least one heating element of the slider. As described in more detail below with the example of FIGS. 3A and 3B, when the slider-disk electric potential difference is not cancelled completely, an attractive electrostatic force pulls the slider towards the disk, which may cause contact between the slider and the disk surface. In contrast to the thermal expansion caused by the heating elements of slider 114, the voltage applied to slider 114 more uniformly reduces the fly height across the GBS of the slider (i.e., the surface of the slider that faces the disk) than the reduction of fly height caused by the thermal expansion or bulging of different portions of the slider towards the disk. The correlation of a change in distance caused by a particular voltage applied to the slider for IVC and differences in the amount of power or current needed to be supplied to a heating element to make contact with the disk surface can provide an accurate way of calibrating power settings for a heating element.

This can be particularly useful for calibrating power settings of a heating element used primarily to thermally expand a portion of the slider associated with the write element, since calibration of a heating element used primarily to thermally expand a portion of the slider associated with the read element can often be performed accurately using a read signal provided by the read element. As discussed in more detail below, the use of IVC to calibrate power settings for a heating element associated with the write element can significantly improve the accuracy of the power settings for the heating element, as compared to modeling or simulating the expansion caused by the heating element based mostly on the read signal.

As will be appreciated by those of ordinary skill in the art with reference to the present disclosure, other implementations of DSD 100 may differ from the example shown in FIG. 1. For example, other implementations of DSD 100 can include additional types of storage media in addition to one or more magnetic disks, such as a non-volatile solid-state memory. As another example variation, TFC settings and IVC settings, or portions relating to calibration of power settings for heating elements, may be stored in the same data structure rather than separate data structures.

FIG. 2A illustrates thermal expansion of slider 114 due to power supplied to heating elements 124 and 126 with a first predetermined ratio of power supplied between the heating elements according to one or more embodiments. The first predetermined ratio can correspond to the power supplied to each of heating element 124 and 126 during a read operation. As shown in the example of FIG. 2A, the majority of the power for the first predetermined ratio is provided to heating element 124 to cause more thermal expansion of the portion of slider 114 including read element 125 so that read element 125 moves closer to disk 120. Bulge profile 1221 of slider 114 results from the thermal expansion caused by the heat generated by heating elements 124 and 126 and is shown in FIG. 2A as a dashed line. Although write element 127 has moved closer toward disk 120, less power is supplied to heating element 126 than to heating element 124 such that write element 127 is not as close to disk 120 as read element 125.

FIG. 2B illustrates thermal expansion of slider 114 due to power supplied to heating elements 124 and 126 with a second predetermined ratio of power between the heating elements according to one or more embodiments. The second predetermined ratio can correspond to the power supplied to each of heating element 124 and heating element 126 during a write operation. As shown in the example of FIG. 2B, the majority of the power for the second predetermined ratio is provided to heating element 126 to cause more thermal expansion of the portion of slider 114 including write element 127 so that write element 127 moves closer to disk 120. Bulge profile 1222 of slider 114 results from the thermal expansion caused by the heat generated by heating elements 124 and 126 and is shown in FIG. 2B as a dashed line. Although read element 125 has moved closer toward disk 120, less power is supplied to heating element 124 than to heating element 126 such that read element 125 is not as close to disk 120 as write element 127.

As noted above, calibrating the power settings for heating element 126 for the write element portion of the slider can be more challenging as compared to calibrating power settings for heating element 124 for the read element portion of the slider. This is because a read signal from read element 125 can be used to more directly measure the thermal expansion caused by heating element 124 due to its proximity to read element 125. In some implementations, spacing loss signals or dual harmonic sensing can be used to determine or estimate the distance between the disk and the portion of the slider including the read element as power supplied to heating element 124 is adjusted. An example of using a Wallace spacing equation is described in U.S. Patent Application Publication No. 2014/0240871, which is assigned to the present applicant and is hereby incorporated by reference herein.

In contrast, the calibration of power settings for heating element 126 is conventionally performed by simulating or estimating the thermal expansion of the portion of the slider including the write element based on the thermal expansion measured for the read element portion of the slider. However, given the close proximity between the write element and the disk surface (e.g., within nanometers), tight control of the fly height for the write element portion of the slider is needed.

In addition, there can be manufacturing variations from one slider to the next that can make such simulations or estimates inaccurate, such as slight differences in slider material compositions and differences in heating element performance that become more noticeable due to the extremely small scale of the slider, its fly height, and the magnetic bits being written in the recording layer of the disk. Furthermore, TFC of the write portion of the slider can be more complicated than TFC of the read portion of the slider due to the localized heating caused by the high frequency write current applied to the write element's write coil during write operations. As discussed in more detail below, the present disclosure uses IVC to more accurately calibrate power settings for heating elements associated with the write element portion of the slider as compared to conventional methods of calibrating such heating elements.

Those of ordinary skill in the art will appreciate with reference to the present disclosure that other arrangements of slider 114 are possible and that slider 114 is shown in FIGS. 2A and 2B for the purposes of illustration. In this regard, the scale and arrangement of components in slider 114 may differ in practice or in other implementations. For example, some sliders may only include a single heating element that may be located between the read element and the write element. The disclosed methods and systems of calibrating of power settings can also be used to improve the accuracy in calibrating the power settings of such a heating element.

FIG. 3A illustrates an initial fly-height of slider 114 over magnetic disk 120 when an initial voltage $V_0$ is applied to the slider according to one or more embodiments. In some cases, the initial voltage $V_0$ can be the OIV that cancels out the disk voltage and eliminates the electrostatic attractive force between the slider and the disk. In the example of FIG. 3A, this would mean that $V_0$ is-200 mV to match the voltage of disk 120. $FH_1$ in FIG. 3A would then correspond to a greatest fly height. In other cases, the initial voltage $V_0$ can correspond to a different voltage, such as a slightly lower voltage than the voltage of disk 120 to passivate slider 114 and protect its components, despite creating a relatively small attractive electrostatic force between slider 114 and disk 120.

FIG. 3B illustrates a reduced fly height, $FH_2$, of slider 114 over the magnetic disk 120 when a first voltage is applied to the slider according to one or more embodiments. The application of the first voltage can be performed as IVC by circuitry 166 in FIG. 1, for example, executing IVC module 14. The first voltage may be stored as part of IVC settings 16 in FIG. 1.

As shown in the example of FIG. 3B, the first voltage is 200 mV, which creates a positive charge on the surface of slider 114 facing the surface of disk 120, which has a negative charge resulting from the voltage of disk 120 being-200 mV. An electric potential difference between slider 114 and disk 120 of 400 mV results and creates an attractive electrostatic force that brings the whole GBS of slider 114 closer to disk 120 by a distance of $FH_1$-$FH_2$.

Unlike the bulge profiles 122 shown in FIGS. 2A and 2B that result in some portions of slider 114 being closer to disk 120 than other portions of slider 114, the full GBS or surface of slider 114 facing disk 120 is brought closer to disk 120 by approximately the same distance. The present disclosure uses this characteristic of IVC to provide a more accurate way of calibrating power settings for heating elements in sliders.

Figure 4:
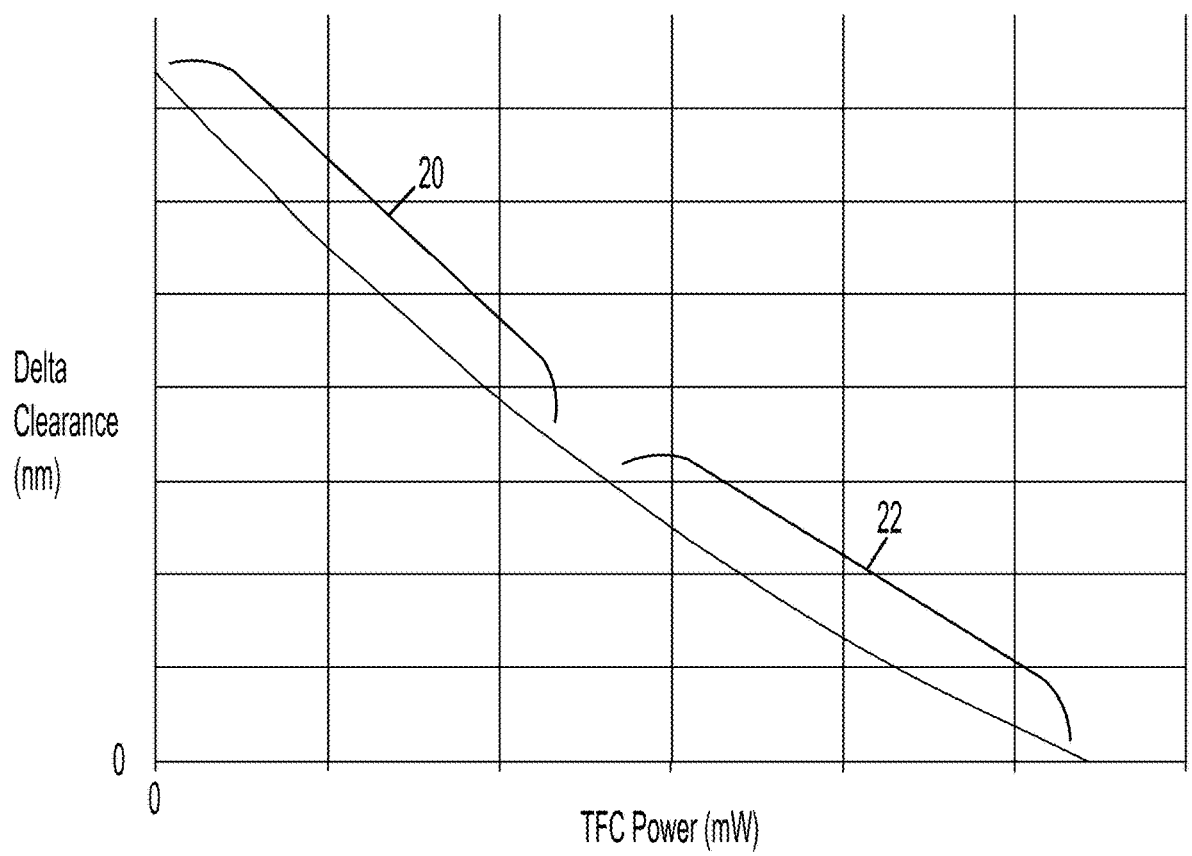
FIG. 4 is a graph showing a change in fly height for a portion of a slider as power is increased to a heating element of the slider according to one or more embodiments.

FIG. 4 is a graph showing a change in fly height for a portion of a slider (i.e., "Delta Clearance" in FIG. 4) as power (i.e., "TFC Power" in FIG. 4) is increased to a heating element of the slider according to one or more embodiments. The curve in the example of FIG. 4 includes a substantially linear, high clearance region 20 and a more nonlinear, low clearance region 22. The nonlinearity of the low clearance region 22 generally results from inefficiencies of the heating element and the material of the slider as power is increased, which may be collectively referred to as a reduction in thermal protrusion efficiency. The low clearance region 22 may also be referred to as a "push-back region."

Given the different characteristics of the protrusion efficiency in the substantially linear region 20 and in the push-back region 22, the present disclosure includes two different techniques for calibrating power settings for the two different regions. An example of the first technique for calibrating power settings in the substantially linear region is provided with the description of FIGS. 5 to 7 below and an example of the second technique for calibrating power settings in the push-back region 22 is provided with the description of FIGS. 8A to 10 below.

Figure 5:
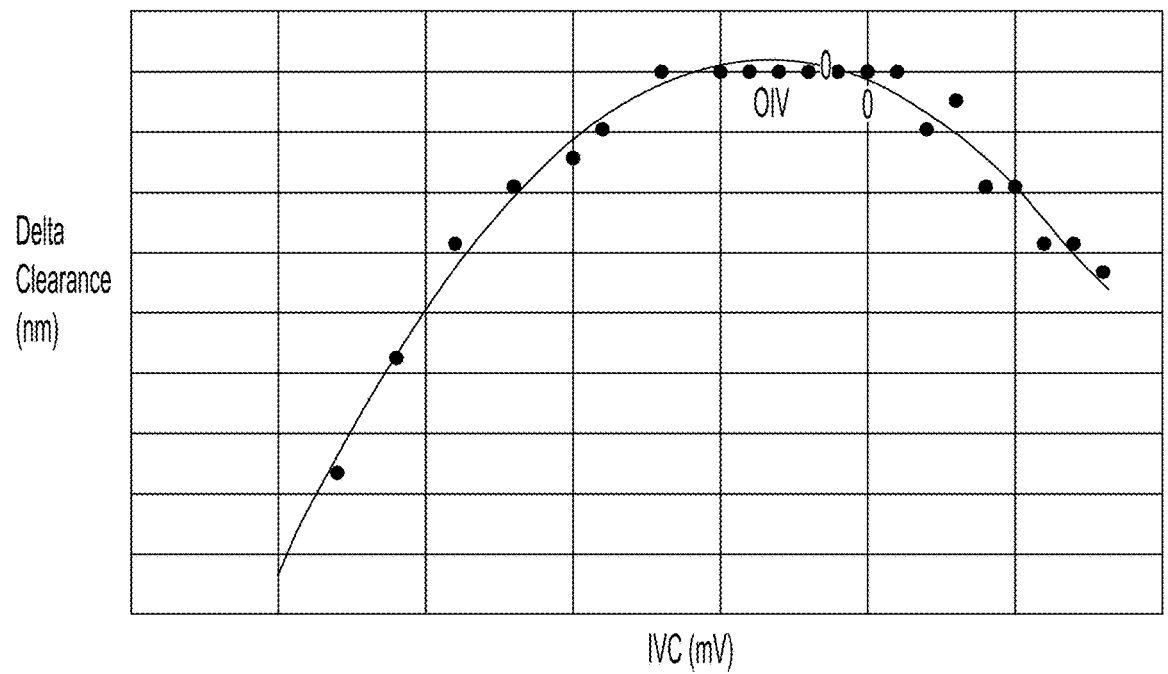
FIG. 5 is a graph showing a change in fly height for a slider as a voltage applied to the slider is changed according to one or more embodiments.

FIG. 5 is a graph showing a change in fly height for a slider (i.e., "Delta Clearance" in FIG. 5) as a voltage applied to the slider (i.e., "IVC" in FIG. 5) is changed according to one or more embodiments. The curve shown in FIG. 5 can be viewed as a calibration of the actuation of the slider toward the disk caused by IVC to derive a relationship or approximation between the voltage applied to the slider and the resulting change in fly height. In some implementations, this derived relationship or approximation may be represented by a formula by fitting a curve to data points, as shown in FIG. 5. In some implementations, this relationship, a lookup table, or equation for the curve can be stored as an IVC setting, such as part of IVC settings 16 in FIG. 1.

As shown in FIG. 5, the data points for the change in fly height follow a generally parabolic curve as the voltage supplied to the slider is varied, with an apex at the OIV for a greatest fly height. In some implementations, the changes in fly height can be measured using a read signal and a spacing loss equation, such as a Wallace spacing loss equation.

The voltage applied to the slider can sweep through different voltages that increase or decrease the electrostatic force between the slider and the disk surface. The signal read from the disk can be used to estimate or determine a change in fly height (shown in FIG. 5 as a delta clearance in nanometers), such as by using spacing loss signals or dual harmonic sensing. Unlike the thermal expansion of the slider caused by heating elements discussed above for FIGS. 2A, 2B, and 4, the change in fly height caused by IVC moves the entire GBS or surface of the slider that faces the disk by substantially the same distance. The present disclosure uses this characteristic of IVC to overcome the challenges presented by estimating or predicting a fly height change caused by thermal expansion near the write element, which may vary from the thermal expansion near the read element as discussed above.

Figure 6:
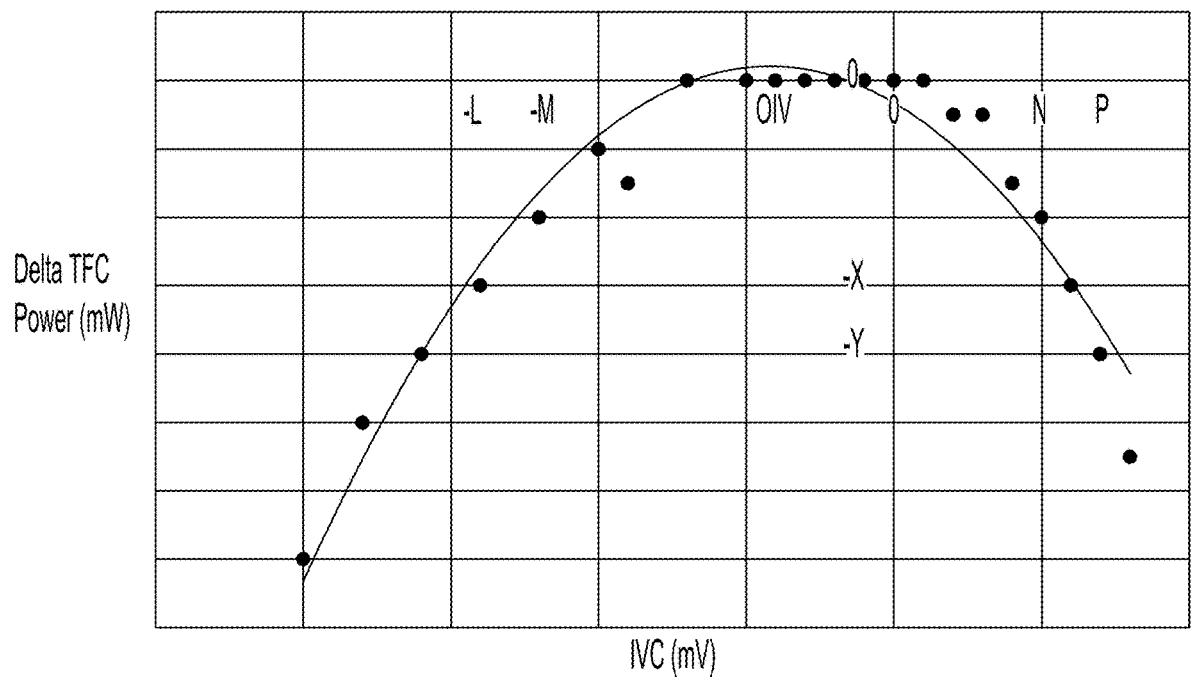
FIG. 6 is a graph showing a change in power supplied to a heating element needed to make a portion of the slider contact the magnetic disk for different voltages applied to the slider according to one or more embodiments.

FIG. 6 is a graph showing a change in power supplied to a heating element (e.g., heating element 126 in FIGS. 2A and 2B) needed to make a portion of the slider (e.g., a portion of the slider including write element 127 in FIGS. 2A and 2B) contact the magnetic disk for different voltages applied to the slider according to one or more embodiments. The curve shown in FIG. 6 can be viewed as a first part of the calibration of the actuation of the slider toward the disk caused by TFC in the high clearance or linear region (i.e., linear region 20 in FIG. 4). In some implementations, this derived relationship or approximation may be represented by an equation by fitting a curve to the data points shown in FIG. 6.

As shown in FIG. 6, less power is needed to be supplied to the heating element as more voltage, either negative or positive, is supplied to the slider. This is because the larger magnitude voltages (e.g., less than-M mV in FIG. 6 or greater than about N mV in FIG. 6) cause the whole slider surface to move closer to the disk surface due to a greater electric potential difference between the slider and the disk, which creates a greater electrostatic force. As a result, less protrusion or thermal expansion of the slider portion is needed to contact the disk surface, which corresponds to less power being supplied to the heating element.

For example, if-L mV is applied to the slider, X mW less power needs to be supplied to the heating element for the portion of the slider to contact the disk than if only the OIV is applied to the slider. As another example from FIG. 6, if P mV is applied to the slider, Y mW less power needs to be supplied to the heating element for the portion of the slider to contact the disk than if only the OIV is applied to the slider. This may be repeated for many different voltages to provide multiple data points as shown in FIG. 6 to determine a curve that approximates the differences in power needed to make contact with the disk surface for the different voltages. As shown in FIG. 6, the different data points may follow a generally parabolic curve.

The data shown in FIGS. 5 and 6 may represent a single slider in a DSD (e.g., slider 114). Each slider in a DSDs for reading and writing data on different magnetic disk surfaces may have different characteristics for changes in fly height caused by IVC or TFC. As noted above, slight differences in the heating elements, suspension, and construction of the sliders can have noticeable effects on the fly height and the ability to control the fly height using IVC and/or TFC. In this regard, each slider in a DSD may be tested to determine the rate of change in fly height (i.e., delta clearance) caused by IVC and the increase in IVC needed to make contact with the disk surface with a reduced power supplied to the heating element (i.e., delta TFC). As discussed in more detail below, these metrics for the slider can be used to more accurately calibrate a power setting for the heating element that is specific to the actual slider, rather than using a simulation or other estimate of the heating element's effect on thermal protrusion of a write element portion of the slider.

Figure 7:
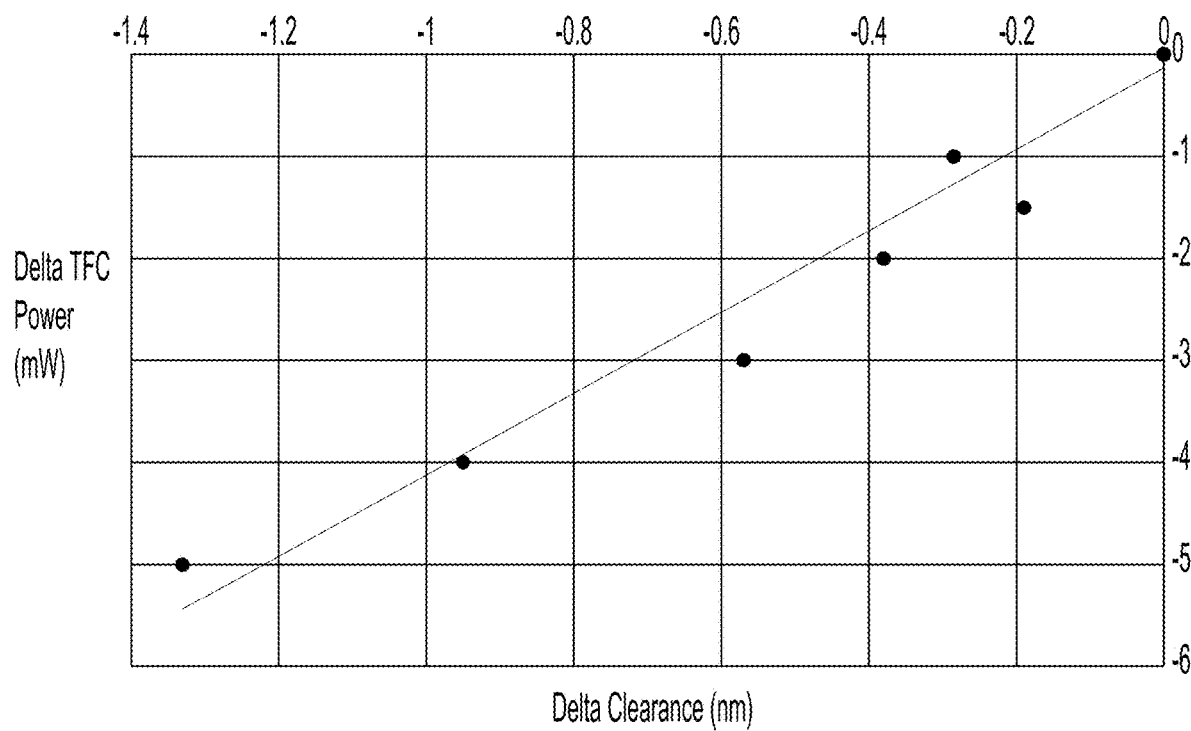
FIG. 7 is a graph showing the calibration of a power setting for a heating element based on a correlation between a change in fly height caused by applying a voltage to a slider and a difference between the power needed to make a portion of the slider contact the magnetic disk when the voltage is applied to the slider according to one or more embodiments.

FIG. 7 is a graph showing the calibration of a power setting for a heating element based on the correlation between the change in fly height caused by applying a voltage to the slider and a difference between the power needed to make a portion of the slider contact the magnetic disk when the voltage is applied to the slider according to one or more embodiments. In other words, the voltages from FIG. 6 for IVC can be converted into the corresponding delta clearance in nanometers using the relationship derived between the voltage and the change in fly height from FIG. 5. The data points in FIG. 7 can be fit to a curve to provide the relationship between the change in power supplied to the heating element and the corresponding change in fly height (i.e., delta clearance in FIG. 7).

In other implementations, FIG. 7 can represent the calibration of a power setting for a heating element associated with the read element (e.g., heating element 124 in FIGS. 2A and 2B). In such implementations, the change in fly height can be determined using spacing loss signals or dual harmonic sensing from a read signal that estimates the distance between the disk and the portion of the slider including the read element as power supplied to heating element 124 is adjusted.

As shown in FIG. 7, the relationship can be represented by a generally linear curve, which is characteristic of the linear region of the thermal expansion or protrusion efficiency provided by the heating element. In some implementations, this derived relationship or approximation may be represented by an equation for the curve shown in FIG. 7. In the example of FIG. 7, the curve can be represented by the equation y=3.99x-0.13. In calibrating the power setting for the heating element in the linear region, the slope of the line may be used to represent the change in fly height caused by each mW of power supplied to the heating element. In this example, the slope can be represented as 1 nm/3.99 mW or 0.25 nm reduction in fly height for each mW of power supplied to the heating element in the high clearance region. In some implementations, this relationship, a lookup table, or an equation can be stored as a power setting for the linear region for the heating element, such as part of TFC settings 12 in FIG. 1.

Those of ordinary skill in the art will appreciate with reference to the present disclosure that the examples of FIGS. 5 to 7 for calibrating a power setting of a heating element in the linear region may vary in different implementations. In this regard, each slider may respond differently and have varying relationships between the applied voltage and change in fly height and/or the thermal protrusion efficiency of the slider.

Figure 8A:
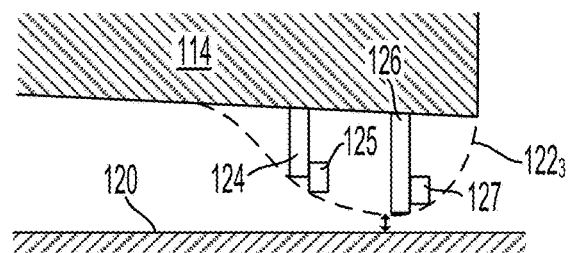
FIG. 8A illustrates the backing off of a portion of a slider from contacting a magnetic disk by reducing a power supplied to a heating element of the slider according to one or more embodiments.

FIG. 8A illustrates the backing off of a portion of a slider from contacting a magnetic disk by reducing a power supplied to a heating element of the slider according to one or more embodiments. As noted above, the calibration of a power setting for the high clearance or linear region of the heating element can be different than the calibration of a power setting for the nonlinear or low clearance region of the heating element. FIGS. 8A to 10 provide an example procedure for calibrating a power setting for a heating element in the low clearance region. In some implementations, the heating element's power settings may be calibrated for both the linear and nonlinear regions and stored as part of TFC settings 12 in FIG. 1.

As shown in FIG. 8A, the portion of the slider including write element 127 is thermally expanded into the nonlinear or low clearance region with bulge profile 1223 nearly contacting the surface of disk 120. Specifically, power can be supplied to heating element 126 until the portion of slider 114 including write element 127 makes contact with the surface of disk 120 and then backing off the portion of slider 114 from the disk surface by slightly reducing the power supplied to heating element 126 by a fixed or predetermined amount. This is shown in FIG. 8A with the bidirectional arrow between bulge profile 1223 and disk 120. The slight reduction in power supplied to the heating element as compared to the larger power required to make contact with the disk (e.g., a reduction of less than 10 mW from 150 mW used to contact the disk) can help ensure that the heating element is in the nonlinear or low clearance region.

Contact with the disk surface may be detected using one or more sensors in slider 114, such as an Embedded Contact Sensor (ECS), a frictional sensor, or an acoustic sensor, for example. In the example of an ECS, slider 114 can include one or more metallic strips located at the GBS of slider 114 that are connected to electrical connection pads for the slider. The resistance of the ECS changes in response to temperature changes and can be used to detect slider-disk contact when the slider temperature suddenly increases due to frictional heating from the disk. After the sensor or sensors detect contact, the TFC module may then slightly reduce the power supplied to the heating element by a predetermined amount (e.g., 6 mW) to back off the portion of the slider from the disk surface.

In some implementations, power may be supplied to both heating elements 124 and 126 using a predetermined ratio of power supplied between the heating elements. The predetermined ratio can correspond to, for example, the power supplied to each of heating element 124 and 126 during a read operation or during a write operation. As shown in the example of FIG. 8A, the majority of the power for the such a predetermined ratio can be provided to heating element 126 to cause more thermal expansion of the portion of slider 114 including write element 127 so that write element 127 moves closer to disk 120. Although read element 125 has moved closer toward disk 120 as well, less power is supplied to heating element 124 in the example of FIG. 8A than to heating element 126 such that read element 125 is not as close to disk 120 as write element 127.

Figure 8B:
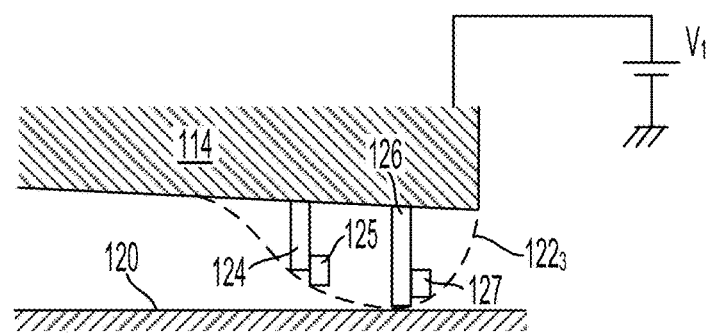
FIG. 8B illustrates contacting the magnetic disk with the reduced power supplied to the heating element by applying a voltage to the slider according to one or more embodiments.

FIG. 8B illustrates slider 114 contacting magnetic disk 120 with reduced power supplied to heating element 126 by applying voltage $V_1$ to the slider according to one or more embodiments. The contact with disk 120 occurs after the backing off of slider 114 shown in FIG. 8A so that slider 114 with bulge profile 1223 remains in the nonlinear region as slider 114 is brought closer to magnetic disk 120 using IVC.

In FIG. 8B, the magnitude of a voltage applied to slider 114 is increased (i.e., made more negative or made more positive) by IVC until slider 114 is brought back into contact with disk 120. The contact with disk 120 may be sensed by one or more sensors in slider 114, such as an ECS, a frictional sensor, or acoustic sensor. The voltage used to move slider 114 into contact with disk 120 can be stored in memory, and as discussed in more detail below, can be used to determine a distance that represents the reduction of bulge profile 1223 caused by the relatively slight reduction in power supplied to heating element 126. This enables a relationship to be determined for the nonlinear or low clearance region between the power supplied to heating element 126 and the change in fly height caused by the thermal expansion of slider 114. In more detail, the relationship derived between the change in fly height and the voltage applied to slider 114, as discussed above with reference to FIG. 5, can be used to determine the relationship between the power supplied to heating element 126 and the change in fly height in the low clearance region, since the relationship between the applied voltage and the change in fly height has already been determined.

Figure 9:
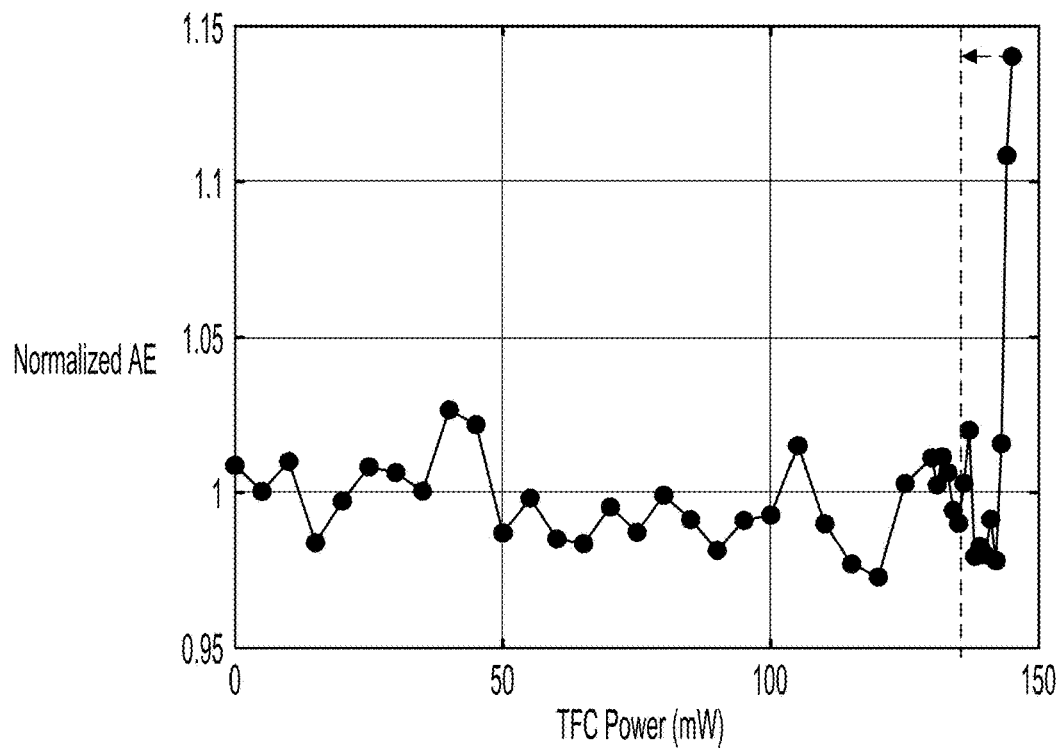
FIG. 9 is a graph showing contact of a portion of a slider with a magnetic disk as power is increased to a heating element and reducing the power to push back to a low clearance fly height of the slider according to one or more embodiments.

FIG. 9 is a graph showing contact of a portion of a slider with a magnetic disk as power is increased to a heating element and then reducing the power to push back the portion of the slider to a low clearance fly height according to one or more embodiments. The graph of FIG. 9 can correspond to the technique shown in FIG. 8A. The operation shown in FIG. 9 can occur with no voltage or IVC applied to the slider. In other implementations, a constant or initial voltage (e.g., the OIV) may be applied to the slider during the operation, which can be accounted for in determining the reduction in fly height caused by an increase in the magnitude of voltage applied to the slider.

In the example of FIG. 9, a normalized signal from an acoustic sensor (i.e., "normalized AE" in FIG. 9) is used to determine when contact is made with the disk surface as the power applied to the slider (i.e., "TFC Power" in FIG. 9) is increased to reduce the fly height of the slider. As shown in FIG. 9, contact with the disk occurs when approximately 145 mW is supplied to the heating element in the slider, which is indicated by the spike in the normalized acoustic signal. The power supplied to the heating element is then reduced by 8 mW to approximately 137 mW, as indicated in FIG. 9 by the dashed vertical line. The thermal protrusion of the slider or bulge profile slightly retracts from the surface of the disk due to the 8 mW decrease in power supplied to the heating element. IVC can then be used to determine the decrease in fly height caused by the 8 mW reduction in power, as discussed below with reference to FIG. 10.

Figure 10:
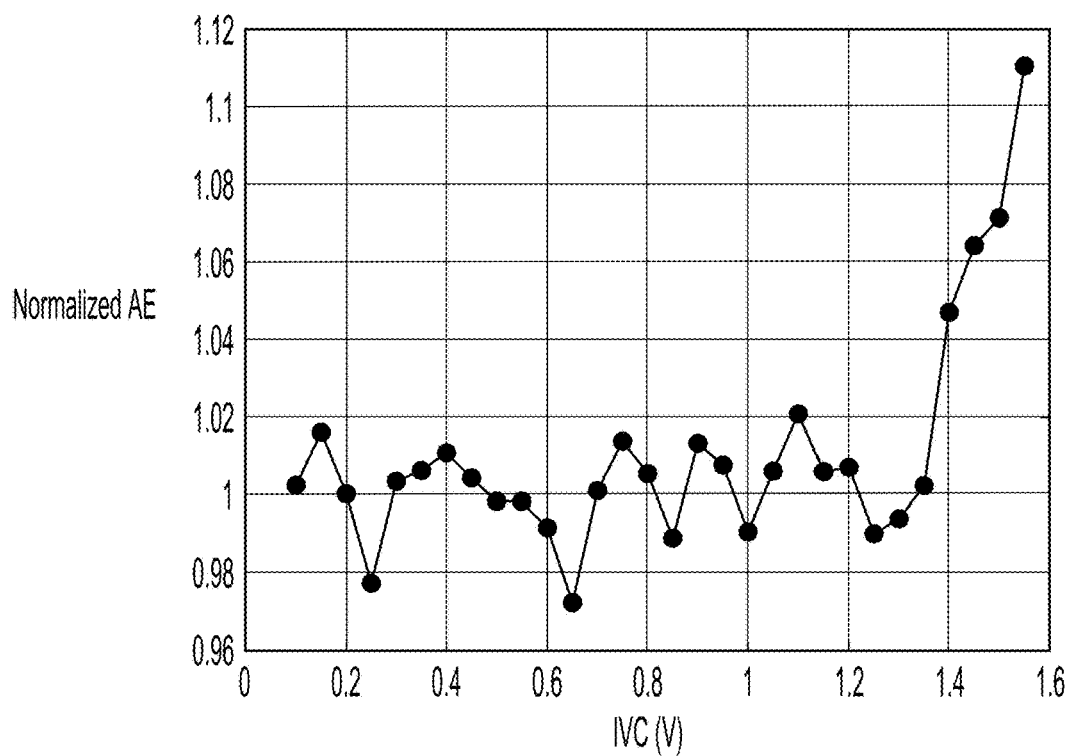
FIG. 10 is a graph showing contact with the magnetic disk caused by applying voltage to the slider while the reduced power is supplied to the heating element according to one or more embodiments.

FIG. 10 is a graph showing contact with the magnetic disk caused by applying voltage to the slider while the reduced power of approximately 137 mW is supplied to the heating element according to one or more embodiments. The operation shown in FIG. 10 occurs after the backing off operation shown in FIG. 9 and corresponds to the technique in FIG. 8B discussed above.

As shown in FIG. 10, the magnitude of the IVC voltage applied to the slider is increased while the slider is in the low clearance or nonlinear region caused by the reduced power supplied to the heating element. The reduced power supplied to the heating element (e.g., 137 mW in the example discussed above for FIG. 9) remains constant as the magnitude of the voltage applied to the slider is increased until the slider makes contact with the disk surface. The decrease in fly height in FIG. 10 is caused by the increase in electric potential difference between the slider and the disk surface, which causes an increase in the attractive electrostatic force between the slider and the disk surface.

In the example of FIG. 10, the slider makes contact with the disk after the voltage is increased to approximately 1.55 V, as shown by the spike or large increase in the normalized acoustic signal measured on the y-axis. The relationship between the power supplied to the heating element and the change in fly height can then be determined for the nonlinear region. In the example of FIGS. 9 and 10, the change in fly height caused by the 8 mW reduction in power supplied to the heating element can be estimated or determined to cause a reduction in fly height corresponding to a 1.55 V increase in IVC applied to the slider. Correlating the previously determined relationship between the change in voltage and change in fly height, as discussed above with reference to FIG. 5, can enable determination of the relationship between the power supplied to the heating element and the change in fly height in the nonlinear region by converting the 1.55 V into a change in fly height in nanometers. For example, if the 1.55 V increase in magnitude for IVC corresponds to a decrease in fly height of 0.8 nm, the relationship or thermal protrusion efficiency of the heating element in the nonlinear region can be expressed as 0.8 nm/8 mW, or a decrease of 0.1 nm for each mW of power supplied to the heating element.

In some implementations, this technique can be repeated for a different relatively slight reduction in power, such as using a 6 mW reduction in power instead of an 8 mW reduction in power. The resulting thermal protrusion efficiencies for the nonlinear region may then be averaged together to provide a final protrusion efficiency that may be stored as a power setting for the heating element, such as in TFC settings 12 in FIG. 1. In other cases, the different thermal protrusion efficiencies could be stored in a lookup table or may be used to fit a curve and derive an equation for determining power settings in the nonlinear region.

Those of ordinary skill in the art will appreciate with reference to the present disclosure that other implementations or variations are possible for the operations and techniques discussed above with reference to FIGS. 8A to 10. For example, the pushback procedure for determining the thermal protrusion efficiency in the nonlinear region may be performed using different predetermined power ratios between two heating elements in the slider that represent a write operation power ratio and a read operation power ratio. In addition, the values used above, such as for changes in power, voltage, or fly height are for the purposes of illustration and may vary in practice.

In this regard, different sliders or different slider and disk interfaces within the same DSD can have different values for changes in power, voltage, or fly height that represent the individual characteristics of the slider, the heating elements, or the disk surface. The foregoing techniques and operations can be performed for each slider in a DSD in some implementations to advantageously calibrate power settings specific to particular heating elements and sliders to provide more accurate control and estimation of thermal protrusion efficiency.

Example Processes

Figure 11:
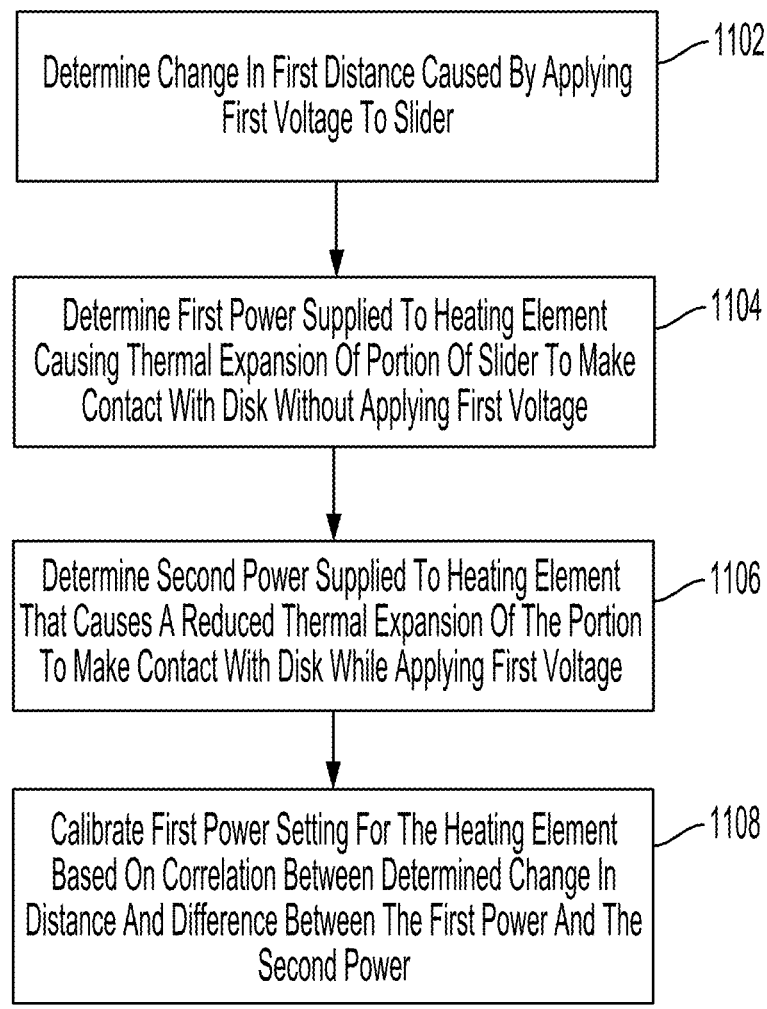
FIG. 11 is a flowchart for a power setting calibration process for a heating element in a high clearance region over a magnetic disk according to one or more embodiments.

FIG. 11 is a flowchart for a power setting calibration process for a heating element in a high clearance or linear region over a magnetic disk according to one or more embodiments. The high clearance region or linear region of thermal protrusion efficiency can correspond to linear region 20 of FIG. 4 and the examples discussed above with reference to FIGS. 5 to 7. The process of FIG. 11 may be used for sliders that include a single heating element or may be used in sliders that may include multiple heating elements, as with the examples discussed above for FIGS. 2A and 2B.

The process of FIG. 11 can be performed by, for example, circuitry 166 of DSD 100 executing TFC module 10 and IVC module 14 in FIG. 1. In this regard, circuitry 166 can, in some implementations, comprise a means for performing the functions of the power setting calibration process of FIG. 11.

In block 1102, a change in a first distance is caused by applying a first voltage to the slider. The first distance can be measured between a portion of a slider including a read element and a disk surface. The voltage can be applied by IVC of the circuitry of the DSD. As discussed above, the application of voltage to the slider can cause the full GBS of the slider to move closer to the disk surface by approximately the same distance. In this regard, the change in the first distance caused by applying the voltage approximately equals a change in a second distance measured between a portion of the slider including a write element and the disk surface. In other words, the change in distance or fly height caused by applying the first voltage is approximately the same across the surface of the slider that faces the disk.

The distance can be determined, for example, as part of or as a result of a previous calibration of the IVC, which may include applying different voltages to the slider (e.g., voltage sweeping) while using changes in the read signal in a spacing loss equation to determine the corresponding changes in distance associated with the applied voltages. In some implementations, the determination of the first distance in block 1102 may occur at a different period of time than other blocks shown in the power setting calibration process of FIG. 11.

In block 1104, a first power is determined that is supplied to a heating element that causes thermal expansion of the portion of the slider to make contact with the magnetic disk without applying the first voltage. In some implementations, no voltage may be applied to the slider when applying the first power in block 1104. In other implementations, a default or initial voltage different from the first voltage, such as the OIV, may be applied to the slider when supplying the first power in block 1104.

Contact with the disk surface while supplying the first power may be determined using one or more sensors of the slider, such as an ECS, frictional, or acoustic sensor of the slider. In some implementations, the TFC module may gradually increase the power supplied to the heating element until contact with the disk surface is detected and then the power being supplied when contact occurred can be recorded as the first power, such as in TFC settings 12 in FIG. 1.

In block 1106, a second power is determined for the heating element while the first voltage is applied to the slider that causes a reduced thermal expansion of the portion of the slider, as compared to the thermal expansion caused by the first power. The second power is less than the first power because the first voltage decreases the fly height between the disk and the portion of the slider including the write element. As a result, less thermal expansion of the portion of the slider is needed to make contact with the disk because the applied first voltage has decreased the second distance by a fixed amount.

In block 1108, a first power setting for the heating element is calibrated based on a correlation between the determined change in distance from block 1102 and a difference between the first power and the second power. Since the calibration is being performed in the linear region of thermal protrusion efficiency, the relationship between the decrease in fly height caused by applying the first voltage and the decrease in power needed to make contact with the disk due to the first voltage is generally linear. As shown in FIG. 7 discussed above, a relationship between changes in power supplied to the heating element and corresponding changes in the second distance (i.e., the distance between the disk surface and the portion of the slider including the write element) can be determined. The determined relationship or calibrated power setting for the high clearance region can be stored as part of TFC settings 12 in FIG. 1.

Unlike conventional methods of determining a distance between the write element portion of the slider and the disk surface that rely on modeling a thermal expansion of the slider, the present disclosure uses IVC as discussed above to more directly measure the change in distance caused by thermal expansion near the write element. This method of calibrating power settings in the high clearance region or linear region of thermal protrusion efficiency can be repeated for each slider to provide a more accurate representation of thermal expansion at the portion of the slider including the write element for each slider.

Those of ordinary skill in the art will appreciate with reference to the present disclosure that other ways of calibrating a power setting for a heating element in the linear region are possible. For example, the process of FIG. 11 may be repeated for several different voltages in the high clearance region and an average rate of thermal protrusion efficiency may be determined for the heating element and used to calibrate power settings for different fly heights. As another example variation, determining the change in the first distance in block 1102 may instead occur between blocks 1106 and 1108 in other implementations.

Figure 12:
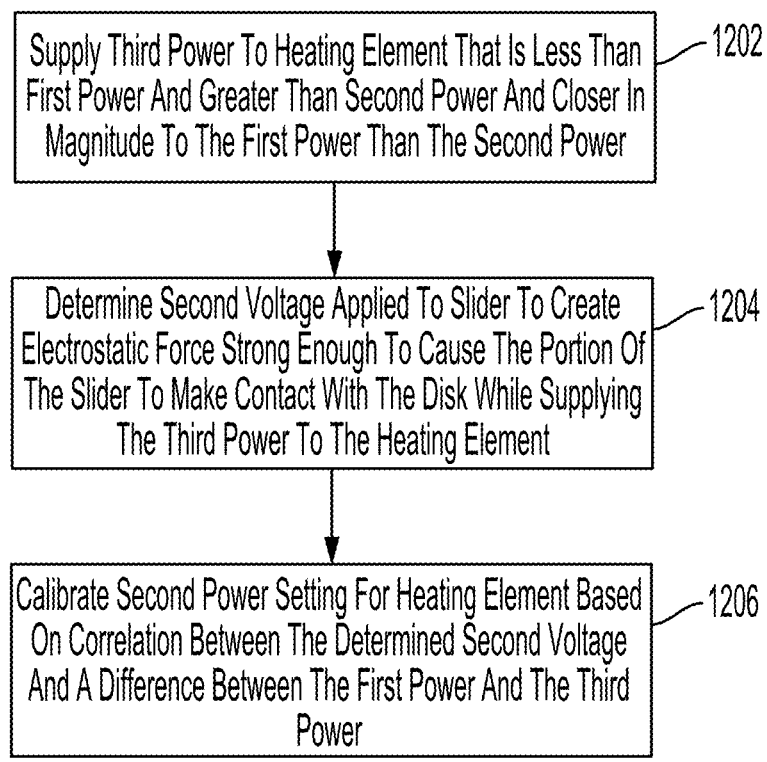
FIG. 12 is a flowchart for a power setting calibration process for a heating element in a low clearance region over a magnetic disk according to one or more embodiments.

FIG. 12 is a flowchart for a power setting calibration process for a heating element in a low clearance region or nonlinear region over a magnetic disk according to one or more embodiments. The low clearance region or nonlinear region of thermal protrusion efficiency can correspond to nonlinear region 22 of FIG. 4 and the examples discussed above with reference to FIGS. 8A to 10. In some implementations, the process of FIG. 12 for the low clearance region may occur after performing the process of FIG. 11 for the high clearance region.

The process of FIG. 12 can be performed by, for example, circuitry 166 of DSD 100 executing TFC module 10 and IVC module 14 in FIG. 1. In this regard, circuitry 166 can, in some implementations, comprise a means for performing the functions of the power setting calibration process of FIG. 12.

In block 1202, a third power is supplied to a heating element of a slider that is less than the first power and greater than the second power discussed above for the process of FIG. 11. The third power is closer in magnitude to the first power than to the second power in that it causes more thermal expansion of the portion of the slider than the second power causes, but not as much thermal expansion of the portion of the slider as the first power. In some implementations, supplying the third power can correspond to the backing off discussed above for FIG. 8A where the third power corresponds to a slightly reduced power from the power used to make the portion of the slider contact the disk surface (e.g., 8 mW less power than the 145 mW used for the first power to contact the disk in the example discussed above). This slightly reduced power positions the portion of the slider in the low clearance or nonlinear region.

In block 1204, a second voltage is determined that is applied to the slider to create electrostatic force strong enough to cause the portion of the slider to make contact with the disk while supplying the third power to the heating element. This second voltage can correspond to $V_1$ in FIG. 8B that is applied to slider 114 to move the slider into contact with the disk surface. As discussed above, the voltage can be applied via IVC and contact with the disk can be detected using one or more sensors of the slider, such as an ECS, a frictional sensor, or an acoustic sensor. In some implementations, the second voltage may be a larger magnitude voltage than a default or initial IVC voltage applied during block 1202, such as the OIV. In other implementations, there may have been no voltage applied to the slider during block 1202.

In block 1206, a second power setting is calibrated for the heating element based on a correlation between the determined second voltage and a difference between the first power and the second power. The predetermined relationship between the change in fly height and the applied IVC voltage is used to determine the reduction in fly height caused by reducing the power supplied to the heating element. Since the application of voltage to the slider generally moves the full GBS of the slider closer to the disk surface, the correlation between the power supplied to the heating element and the change in fly height can be determined more accurately than estimating or simulating thermal expansion based on the thermal expansion of the read element portion of the slider. The relationship or the calibrated power setting determined in block 1206 may be stored as part of TFC settings 12 in FIG. 1.

Those of ordinary skill in the art will appreciate with reference to the present disclosure that other ways of calibrating a power setting for a heating element in the nonlinear region are possible. For example, the process of FIG. 12 may be performed before the process of FIG. 11 in some implementations. In addition, the process of FIG. 12 may be repeated for multiple reduced powers (i.e., a fourth power replacing the third power discussed above) to determine respective voltages (i.e., a third voltage to replace the second voltage discussed above) and corresponding distances that may be used to further calibrate a second power setting for the heating element and/or to fit a curve relating the supplied power to the change in fly height in the low clearance region.

Figure 13:
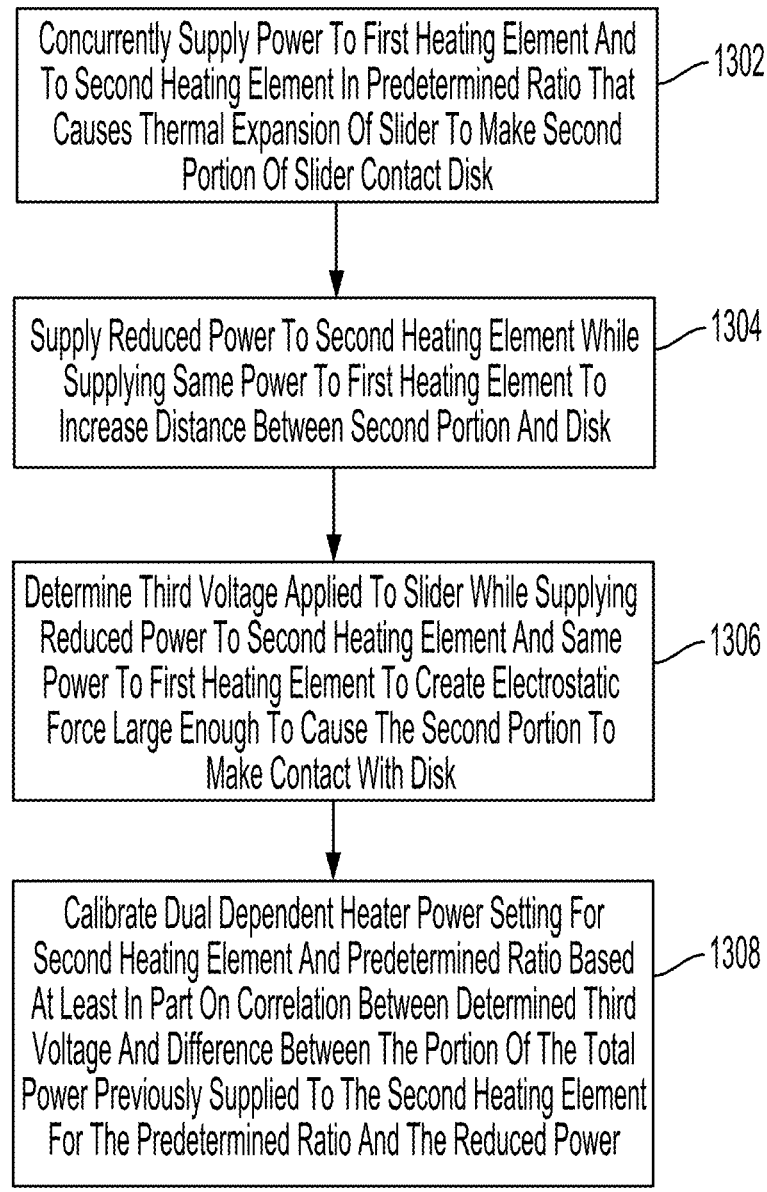
FIG. 13 is a flowchart for a dual dependent heater power setting process for a heating element with a predetermined power ratio according to one or more embodiments.

FIG. 13 is a flowchart for a dual dependent heater power setting process for a heating element with a predetermined power ratio according to one or more embodiments. In some implementations, the predetermined power ratio can include portions of a total power that are supplied to a first heating element and to a second heating element for a particular type of operation or condition, such as during a preheating phase, a write operation, or a read operation. The process of FIG. 13 is similar to the process of FIG. 12 in that a push back power is used to increase a fly height from the disk surface and IVC is used to make up the reduction in fly height and calibrate the heating element power setting.

The process of FIG. 13 can be performed by, for example, circuitry 166 of DSD 100 executing TFC module 10 and IVC module 14 in FIG. 1. In this regard, circuitry 166 can, in some implementations, comprise a means for performing the functions of the dual dependent heater power setting process of FIG. 13.

In block 1302, power is concurrently supplied to a first heating element of a slider and to a second heating element of the slider in a predetermined ratio that causes thermal expansion of the slider to make a second portion of the slider including a write element make contact with a magnetic disk surface. As noted above, contact with the disk surface may be detected using one or more sensors of the slider.

In block 1304, a reduced power is supplied to the second heating element while supplying the same power to the first heating element as previously supplied for the predetermined ratio to increase the distance between the second portion of the slider and the disk surface. Unlike the calibration of the first heating element that more directly causes thermal expansion of the portion of the slider including the read element (i.e., the first portion of the slider), the read signal cannot be used as directly to measure a change in the bulge profile of the slider caused by thermal expansion due to the second heating element. In this regard, calibration of power settings for the first heating element may be performed in some implementations by measuring changes in the read signal while varying the power supplied to the first heating element while maintaining a predetermined power to the second heating element In block 1306 of FIG. 13, a third voltage is determined to supply to the slider via IVC while supplying the reduced power to the second heating element and the same power to the first heating element to create an electrostatic force large enough to cause the second portion to make contact with the magnetic disk. The third voltage may be a larger magnitude voltage than what was supplied for IVC during block 1302 (e.g., the OIV). In other implementations, no voltage may have been supplied during block 1302.

In block 1308, a dual dependent heater power setting is calibrated for the second heating element and the predetermined ratio based at least in part on a correlation between the determined third voltage and a difference between the portion of the total power previously supplied to the second heating element for the predetermined ratio and the reduced power. In other words, the reduced power supplied to the second heating element is correlated to the third voltage used to make up the reduction in fly height caused by the reduced power. The third voltage can be converted into a distance in nanometers using a predetermined relationship for changes in IVC voltage and changes in fly height, as discussed above with reference to FIG. 5. The calibrated power setting and/or the relation between the reduced power and the change in fly height can be stored as part of TFC settings 12 in FIG. 1.

Those of ordinary skill in the art will appreciate with reference to the present disclosure that other ways of calibrating a dual dependent power setting are possible. In addition, the process of FIG. 13 may be repeated for additional predetermined ratios (i.e., a second predetermined ratio of power supplied between the first and second heating elements) representing different operations or conditions of the slider.

The foregoing systems and methods for calibrating TFC power settings can provide a more accurate calibration and control of the power supplied to a heating element that is associated with thermal expansion of a portion of the slider that includes the write element. As discussed above, the increase in accuracy in determining the effect on fly height caused by thermal expansion of the portion of the slider including the write element can allow for reduced fly heights with less errors in reading data and with less risk of the slider unintentionally contacting or being damaged by the disk surface. This can facilitate a higher areal density in data storage on the disk since smaller grains or magnetic bits can be written on the disk surface when a smaller fly height is more tightly controlled. The foregoing systems and methods for calibrating TFC power settings also provide for more directly measuring the effects of a particular heating element on a particular slider as compared to simulations that may not fully take into account variations in slider material or different performance efficiencies of heating elements.

OTHER EMBODIMENTS

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes processor or controller circuitry to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed upon the overall system. Those of ordinary skill in the art may implement the described functionality in varying ways for each particular application, but such implementation decisions should not be interpreted as causing a departure from the scope of the present disclosure.

The various illustrative logical blocks, units, modules, processor circuitry, and controller circuitry described in connection with the examples disclosed herein may be implemented or performed with a general purpose processor, a GPU, a DSP, an ASIC, an FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. Processor or controller circuitry may also be implemented as a combination of computing devices, e.g., a combination of a DSP and a microprocessor, a plurality of microprocessors, an SoC, one or more microprocessors in conjunction with a DSP core, or any other such configuration.

The activities of a method or process described in connection with the examples disclosed herein may be embodied directly in hardware, in a software module executed by processor or controller circuitry, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to processor or controller circuitry such that the processor or controller circuitry can read information from, and write information to, the storage medium. In the alternative, the storage medium may be integral to processor or controller circuitry. The processor or controller circuitry and the storage medium may reside in an ASIC or an SoC.

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive. In addition, the use of language in the form of "at least one of A and B" in the following claims should be understood to mean "only A, only B, or both A and B."

What is claimed is:

1. A Data Storage Device (DSD), comprising:
  a magnetic disk;
  a slider configured to move over or under a surface of the magnetic disk, the slider including:
    a first heating element for controlling a first distance between a first portion of the slider and the magnetic disk, the first portion of the slider including a read element; and
    a second heating element for controlling a second distance between a second portion of the slider and the magnetic disk, the second portion of the slider including a write element; and
  circuitry configured to:
    determine a first power supplied to the second heating element that causes thermal expansion of the second portion of the slider to make contact with the magnetic disk without applying a first voltage to the slider that causes a change in the first distance by causing an electrostatic force between the slider and the magnetic disk, wherein the change in the first distance approximately equals a change in the second distance caused by applying the first voltage to the slider;

determine a second power supplied to the second heating element that causes a reduced thermal expansion of the second portion of the slider as compared to the first power to make contact with the magnetic disk while applying the first voltage to the slider; and calibrate a first power setting for the second heating element based on a correlation between the change in the first distance and a difference between the first power and the second power.

2. The DSD of claim 1, wherein the first power setting corresponds to a thermal expansion of the second portion of the slider in a high clearance region between the magnetic disk and the slider where the thermal expansion of the second portion of the slider is substantially linear with respect to power supplied to the second heating element.

3. The DSD of claim 1, wherein the circuitry is further configured to:

supply a third power to the second heating element, the third power being less than the first power and greater than the second power and closer in magnitude to the first power than to the second power, wherein supplying the third power causes the second portion of the slider to thermally expand closer to the magnetic disk than supplying the second power to the second heating element;

determine a second voltage applied to the slider to create an electrostatic force between the slider and the magnetic disk that is strong enough to cause the second portion of the slider to make contact with the magnetic disk while supplying the third power to the second heating element; and calibrate a second power setting for the second heating element based on a correlation between the determined second voltage and a difference between the first power and the third power, wherein the second power setting corresponds to a thermal expansion of the second portion of the slider in a low clearance region between the magnetic disk and the slider.

4. The DSD of claim 3, wherein the thermal expansion of the second portion of the slider in the low clearance region is nonlinear with respect to power supplied to the second heating element.

5. The DSD of claim 3, wherein the circuitry is further configured to:

supply a fourth power to the second heating element, the fourth power being less than the first power and the third power but greater than the second power and closer in magnitude to the first power than to the third power, wherein supplying the fourth power causes the second portion of the slider to thermally expand closer to the magnetic disk than supplying the second power to the second heating element;

determine a third voltage applied to the slider to create an electrostatic force between the slider and the magnetic disk that is strong enough to cause the second portion of the slider to make contact with the magnetic disk while supplying the fourth power to the second heating element; and further calibrate the second power setting for the second heating element based on a correlation between the determined third voltage and a difference between the first power and the fourth power.

6. The DSD of claim 1, wherein the circuitry is further configured to use a read signal from the read element of the first portion of the slider to determine the change in the first distance caused by applying the first voltage to the slider.

7. The DSD of claim 1, wherein the circuitry is further configured to:

supply a fourth power to the first heating element that causes thermal expansion of the first portion of the slider toward the magnetic disk;

use the read signal from the read element of the first portion of the slider to determine a change in distance between the first portion and the magnetic disk caused by the thermal expansion of the first portion due to the fourth power; and calibrate a power setting for the first heating element using the determined change in distance.

8. The DSD of claim 1, wherein the circuitry is further configured to:

concurrently supply power to the first heating element and to the second heating element that causes thermal expansion of the slider to make the second portion contact the magnetic disk, wherein the power is supplied to the first heating element and to the second heating element in a first predetermined ratio such that the power supplied to each of the first heating element and the second heating element sum to a total power;

supply a reduced power to the second heating element while supplying the same power to the first heating element as previously supplied for the first predetermined ratio, the reduced power being less than the portion of the total power previously supplied to the second heating element for the first predetermined ratio, wherein supplying the reduced power to the second heating element increases the distance between the second portion and the magnetic disk as compared to the distance between the second portion and the magnetic disk caused by thermal expansion of the second portion when power is concurrently supplied to the first heating element and the second heating element using the first predetermined ratio of the total power;

determine a third voltage applied to the slider while supplying the reduced power to the second heating element and while supplying the same power to the first heating element as for the first predetermined ratio to create an electrostatic force between the slider and the magnetic disk that is large enough to cause the second portion of the slider to make contact with the magnetic disk; and calibrate a dual dependent heater power setting for the second heating element and the first predetermined ratio based at least in part on a correlation between the determined third voltage and a difference between the portion of the total power previously supplied to the second heating element for the first predetermined ratio and the reduced power.

9. The DSD of claim 8, wherein the circuitry is further configured to:

concurrently supply power to the first heating element and to the second heating element that causes thermal expansion of the slider to make the second portion contact the magnetic disk, wherein the power is supplied to the first heating element and to the second heating element in a second predetermined ratio such that the power supplied to each of the first heating element and the second heating element sum to the total power, and wherein the first predetermined ratio is different from the second predetermined ratio;

supply a second reduced power to the second heating element while supplying the same power to the first heating element as previously supplied for the second predetermined ratio, the second reduced power being less than the portion of the total power previously supplied to the second heating element for the second predetermined ratio, wherein supplying the second reduced power to the second heating element increases the distance between the second portion and the magnetic disk as compared to the distance between the second portion and the magnetic disk caused by thermal expansion of the second portion when power is currently supplied to the first heating element and the second heating element using the second predetermined ratio of the total power;

determine a fourth voltage applied to the slider while supplying the second reduced power to the second heating element and while supplying the same power to the first heating element as for the second predetermined ratio to create an electrostatic force between the slider and the magnetic disk that is large enough to cause the second portion of the slider to make contact with the magnetic disk; and calibrate a second dual dependent heater power setting for the second heating element and the second predetermined ratio based at least in part on a correlation between the determined fourth voltage and a difference between the portion of the total power previously supplied to the second heating element for the second predetermined ratio and the second reduced power.

10. A method of calibrating a heating element of a slider in a Data Storage Device (DSD), the method comprising:
determining a change in distance caused by applying a first voltage to the slider, the first voltage causing an electrostatic force between the slider and the magnetic disk, wherein the change in distance is approximately the same across a surface of the slider that faces the magnetic disk;

determining a first power supplied to the heating element that causes thermal expansion of a portion of the slider to make contact with a magnetic disk of the DSD without applying the first voltage to the slider;

determining a second power supplied to the heating element that causes a reduced thermal expansion of the portion of the slider as compared to the first power that makes contact with the magnetic disk while applying the first voltage to the slider; and calibrating a first power setting for the heating element based on a correlation between the determined change in distance and a difference between the first power and the second power.

11. The method of claim 10, wherein the first power setting corresponds to a thermal expansion of the portion of the slider in a high clearance region between the magnetic disk and the slider where the thermal expansion of the portion of the slider is substantially linear with respect to power supplied to the heating element.

12. The method of claim 10, further comprising:
supplying a third power to the heating element, the third power being less than the first power and greater than the second power and closer in magnitude to the first power than to the second power, wherein supplying the third power causes the portion of the slider to thermally expand closer to the magnetic disk than supplying the second power to the heating element;

determining a second voltage applied to the slider to create an electrostatic force between the slider and the magnetic disk that is strong enough to cause the portion of the slider to make contact with the magnetic disk while supplying the third power to the heating element; and calibrating a second power setting for the heating element based on a correlation between the determined second voltage and a difference between the first power and the third power, wherein the second power setting corresponds to a thermal expansion of the portion of the slider in a low clearance region between the magnetic disk and the slider.

13. The method of claim 12, wherein the thermal expansion of the portion of the slider in the low clearance region is nonlinear with respect to power supplied to the heating element.

14. The method of claim 12, further comprising:
supplying a fourth power to the heating element, the fourth power being less than the first power and the third power but greater than the second power and closer in magnitude to the first power than to the third power, wherein supplying the fourth power causes the portion of the slider to thermally expand closer to the magnetic disk than supplying the second power to the heating element;

determining a third voltage applied to the slider to create an electrostatic force between the slider and the magnetic disk that is strong enough to cause the portion of the slider to make contact with the magnetic disk while supplying the fourth power to the heating element; and further calibrating the second power setting for the heating element based on a correlation between the determined third voltage and a difference between the first power and the fourth power.

15. The method of claim 10, further comprising using a read signal from a read element of the slider to determine the change in distance caused by applying the first voltage to the slider.

16. The method of claim 10, further comprising:
supplying a fourth power to a different heating element of the slider that causes thermal expansion of a different portion of the slider toward the magnetic disk, the different portion of the slider including a read element configured to magnetically read data from the magnetic disk;

using a read signal from the read element to determine a different change in distance between the different portion of the slider and the magnetic disk caused by the thermal expansion of the different portion due to the fourth power; and calibrating a power setting for the different heating element using the determined different change in distance.

17. The method of claim 10, further comprising:
concurrently supplying power to the heating element and to a different heating element of the slider that causes thermal expansion of the slider to make the portion of the slider contact the magnetic disk, wherein the power is supplied to the heating element and to the different heating element in a first predetermined ratio such that the power supplied to each of the heating element and the different heating element sum to a total power;

supplying a reduced power to the heating element while supplying the same power to the different heating element as previously supplied for the first predetermined ratio, the reduced power being less than the portion of the total power previously supplied to the heating element for the first predetermined ratio, wherein supplying the reduced power to the heating element increases the distance between the portion of the slider and the magnetic disk as compared to the distance between the portion of the slider and the magnetic disk caused by thermal expansion of the portion when power is concurrently supplied to the different heating element and the heating element using the first predetermined ratio of the total power;

determining a third voltage applied to the slider while supplying the reduced power to the heating element and while supplying the same power to the different heating element as for the first predetermined ratio to create an electrostatic force between the slider and the magnetic disk that is large enough to cause the portion of the slider to make contact with the magnetic disk; and calibrating a dual dependent heater power setting for the heating element and the first predetermined ratio based at least in part on a correlation between the determined third voltage and a difference between the portion of the total power previously supplied to the heating element for the first predetermined ratio and the reduced power.

18. The method of claim 17, further comprising:

concurrently supplying power to the heating element and to the different heating element that causes thermal expansion of the slider to make the portion of the slider contact the magnetic disk, wherein the power is supplied to the different heating element and to the heating element in a second predetermined ratio such that the power supplied to each of the different heating element and the heating element sum to the total power, and wherein the first predetermined ratio is different from the second predetermined ratio;

supplying a second reduced power to the heating element while supplying the same power to the different heating element as previously supplied for the second predetermined ratio, the second reduced power being less than the portion of the total power previously supplied to the heating element for the second predetermined ratio, wherein supplying the second reduced power to the heating element increases the distance between the portion of the slider and the magnetic disk as compared to the distance between the portion of the slider and the magnetic disk caused by thermal expansion of the portion when power is concurrently supplied to the different heating element and the heating element using the second predetermined ratio of the total power;

determining a fourth voltage applied to the slider while supplying the second reduced power to the heating element and while supplying the same power to the different heating element as for the second predetermined ratio to create an electrostatic force between the slider and the magnetic disk that is large enough to cause the portion of the slider to make contact with the magnetic disk; and calibrating a second dual dependent heater power setting for the heating element and the second predetermined ratio based at least in part on a correlation between the determined fourth voltage and a difference between the portion of the total power previously supplied to the heating element for the second predetermined ratio and the second reduced power.

19. A Data Storage Device (DSD), comprising:

a magnetic disk;

a slider configured to move above or below a surface of the magnetic disk, the slider including:
  a first heating element for controlling a first distance between a first portion of the slider and the magnetic disk, the first portion of the slider including a read element; and
  a second heating element for controlling a second distance between a second portion of the slider and the magnetic disk, the second portion of the slider including a write element; and means for:
  determining a change in the first distance caused by applying a first voltage to the slider to cause an electrostatic force between the slider and the magnetic disk, wherein the change in the first distance approximately equals a change in the second distance caused by applying the first voltage to the slider;
  determining a first power supplied to the second heating element that causes thermal expansion of the second portion of the slider that makes contact with the magnetic disk without applying the first voltage to the slider;
  determining a second power supplied to the second heating element that causes a reduced thermal expansion of the second portion of the slider as compared to the first power that makes contact with the magnetic disk while applying the first voltage to the slider; and
  calibrating a first power setting for the second heating element based on a correlation between the determined change in the first distance and a difference between the first power and the second power.

20. The DSD of claim 19, further comprising means for:

supplying a third power to the second heating element, the third power being less than the first power and greater than the second power and closer in magnitude to the first power than to the second power, wherein supplying the third power causes the second portion of the slider to thermally expand closer to the magnetic disk than supplying the second power to the second heating element;

determining a second voltage applied to the slider to create an electrostatic force between the slider and the magnetic disk that is strong enough to cause the second portion of the slider to make contact with the magnetic disk while supplying the third power to the second heating element; and calibrating a second power setting for the second heating element based on a correlation between the determined second voltage and a difference between the first power and the third power, wherein the second power setting corresponds to a thermal expansion of the second portion of the slider in a low clearance region between the magnetic disk and the slider.

\* \* \* \* \*